Patented Feb. 12, 1935

1,990,841

UNITED STATES PATENT OFFICE 1,990,841

CONDENSATION PRODUCT AND PROCESS OF MAKING SAME

Heinz Scheyer, Frankfort-on-the-Main, Germany, assignor to General Aniline Works, Inc., New York, N. Y., a corporation of Delaware No Drawing. Application October 18, 1932, Serial No. 638,391. In Germany December 2, 1930

4 Claims. (Cl. 260—57)

This application is a continuation in part of my copending application Serial Number 577,157, filed November 24, 1931.

My present invention relates to new condensation products derived from "glyoxal-dianthraquinone"-compounds or the general formula:

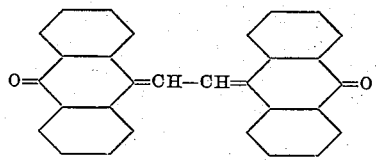

in which the anthraquinone nuclei may be substituted by monovalent substituents, such as halogen-, alkyl- or aryl-groups, and to a process of making these new condensation products.

The starting materials may be prepared according to the process described in U. S. Patent No. 1,646,782. The present new condensation products are obtained by treating said starting materials with an acid condensing agent, particularly either of the group consisting of an aluminum and ferric halide, suitable for the Friedel-Crafts' reaction, at temperatures from about 100–200° C., or of the group of sulfuric acid, such as chlorosulfonic acid or fuming sulfuric acid. The condensation reaction may be advantageously carried out with addition of a suitable diluent, such as sodium chloride in addition to the aluminum chloride and of a suitable oxidant such as manganese dioxide or halogen and the like.

Instead of starting from the aforesaid glyoxal-dianthraquinone compounds (described in U. S. Patent 1,646,782) themselves, one may convert them previously into their claret-red to violet colored derivatives by treatment with an alkaline condensing agent according to U. S. Patent 1,709,956 and subsequently subject these alkaline condensation products to the action of an acid condensing agent. In this case sulfuric acid is a particularly suitable condensing agent.

In view of the properties of the new condensation products one may assume that an intramolecular condensation and formation of a new ring system has taken place during the reaction.

The new condensation products obtained according to my present process are quite different from the initial products as regards their chemical behavior. In common therewith they are soluble in an alkaline hydrosulfite solution from which the vegetable fiber is dyed intense brownish shades of a good fastness.

The final products obtained by previously treating the initial products with an alkaline condensing agent and subsequently subjecting the products thus obtained to the action of an acid condensing agent generally have the same chemical constitution as those obtained by directly treating the starting materials with an acid condensing agent. Consequently the chemical and tinctorial behavior is generally the same. Only in some cases the shade of dyeings obtained therewith is somewhat different owing probably to the fact that, when subjecting the initial products directly to an acid condensing reaction with the addition of an oxidant, a simultaneous entrance of halogen into the molecule of the new condensation products may occur, when working under such conditions that halogen is liberated from the reacting agents used.

In order to further illustrate my invention the following examples are given, the parts being by weight and all temperatures in centigrade degrees, but it is understood that my invention is not limited to the particular products nor reacting conditions mentioned therein:

Example 1

10 parts of the condensation product derived from anthrone and glyoxalsulfate (cf. Example 1 of U. S. Patent 1,646,782) are mixed with about 100 parts of anhydrous alumonium chloride, 25 parts of sodium chloride and 5.5 parts of manganese dioxide of about 84% strength and the mixture is heated for about half an hour at about 140°. Then the liquid reaction mass is poured on ice water, acidified and stirred for some time with the addition of a sodium-bisulfite solution. It is filtered off and may be purified by dissolving it in the vat and isolating it therefrom in the usual manner. It dissolves in concentrated sulfuric acid with a violet color and dyes cotton from a yellowish brown vat reddish brown shades of a good fastness.

When carrying out the reaction at temperatures beginning from about 100°, one needs a longer time of duration; one may likewise increase the temperature of reaction to about 200° and carry out the reaction with the addition of ferric chloride.

*Example 2*

10 parts of the condensation product, used as starting material in Example 1, are dissolved in about 400 parts of sulfuric acid monohydrate while cooling to about 12°. 15 parts of potassium persulfate are added during 1 to 2 hours. The greenish blue color of the solution thereby turns to reddish blue. The reaction product is isolated by pouring the reaction mass on ice and filtered off. It represents a reddish brown powder and dyes cotton from a brownish vat fast reddish brown shades. By washing the raw product with warm chlorobenzene and alcohol it may be purified.

*Example 3*

11 parts of the condensation product derived from 2-chloroanthrone and glyoxal are mixed with about 100 parts of aluminium chloride, 25 parts of sodium chloride and 4.2 parts of manganese dioxide of about 84% strength. The mixture is slowly heated to about 140° and the mass is kept at this temperature for about half an hour. The new dyestuff, isolated as described in Example 1, dyes cotton from the vat reddish brown shades which are very similar to those obtained with the dyestuff of Example 1.

A corresponding dyestuff is obtained, when using as starting material the condensation product derived from 2-methyl- or 2-phenyl-anthrone and glyoxal.

*Example 4*

Into a mixture of about 100 parts of aluminium chloride and 25 parts of sodium chloride while well stirring at about 140° a strong current of chlorine and simultaneously slowly 10 parts of the initial product used in Example 3 are introduced. The reaction mass is kept for about half an hour at this temperature. The dyestuff thus obtained dyes cotton from a yellowish brown vat full reddish brown shades.

A similar result is obtained, when simultaneously blowing air into the reaction mass instead of introducing chlorine.

*Example 5*

10 parts of the initial product used in Examples 3 and 4 are introduced at about 90° into about 300 parts of chlorosulfonic acid and the mixture is stirred for about an hour at this temperature, until the initial product has disappeared. Then the reaction mass is poured on ice and the formed precipitate is filtered off. The reaction product represents a reddish brown powder, it dissolves in sulfuric acid with a reddish blue color and dyes cotton from a brown vat fast reddish brown shades.

When using as condensing agent a fuming sulfuric acid containing about 30% of free sulfur trioxide, in a similar manner a sulfonic acid derivative of said dyestuff is obtained.

*Example 6*

10 parts of the initial product used in the foregoing Examples 3 to 5 are dissolved at room temperature in about 400 parts of a fuming sulfuric acid containing only about 2% of free sulfur trioxide and at about 15° during about an hour 5 parts of manganese dioxide are added, the bluish green color of the solution thereby turning to reddish blue. The reaction mass is poured on ice and the formed precipitate is filtered off. The product thus obtained is identical with the product of Example 5.

*Example 7*

11 parts of the condensation product derived from 2.6-dichloro-anthrone and glyoxalsulfate are mixed with about 100 parts of aluminium chloride, 25 parts of sodium chloride and 8.4 parts of manganese dioxide. The mixture is heated at about 140°. The new dyestuff isolated as described in the foregoing examples may be purified by converting it into the sulfate which is scarcely soluble in concentrated sulfuric acid, separating the sulfate from the more soluble impurities by filtration and decomposing it by addition of water. The new dyestuff dyes cotton from a yellowish brown vat brown shades.

*Example 8*

The condensation product derived from anthrone and glyoxal is subjected to the action of an alcoholic caustic potash solution for several hours and the bluish red condensation product is isolated as described in Example 1 of U. S. Patent 1,709,956.

10 parts of this product are mixed with about 100 parts of aluminium chloride and 25 parts of sodium chloride and while stirring the mixture is slowly heated to about 140° and kept at this temperature until all starting material has disappeared. The condensation product is isolated in the customary manner. It forms when recrystallized from nitro-benzene brown prisms, soluble in concentrated sulfuric acid with a dichroic violet-red color. It dyes cotton from a yellowish brown vat reddish brown shades. The dyestuff is very similar with the dyestuff of Example 1.

*Example 9*

When starting from the condensation product derived from 2-chloro-anthrone and glyoxalsulfate and subjecting it to the action of an alcoholic caustic potash solution and subsequently of an aluminium-chloride fusion in the same manner as described in Example 5, the new dyestuff thus obtained forms when dry a brown powder recrystallizing from nitrobenzene in form of brown prisms. It dissolves in concentrated sulfuric acid with a bluish violet color and forms a yellowish brown vat from which cotton is dyed full reddish brown shades. The dyestuff is very similar to those of Examples 3 to 6.

When introducing the alkaline reaction product into concentrated sulfuric acid at about 140–150°, instead of treating it with aluminium chloride, the final product is very smoothly formed.

*Example 10*

The condensation product derived from anthrone and glyoxal is treated with an alcoholic caustic potash solution as said in Example 8.

10 parts of this condensation product are introduced at about 145° into about 100 parts of concentrated sulfuric acid. The greenish coloration of the solution thereby almost immediately turns to violet. The reaction mass is kept for a short time at this temperature and then cooled down and poured on ice. The dyestuff separates in the form of brown flakes, it is filtered off, washed out and dried. It corresponds in its properties with the product of Example 8. But according to the conditions applied a simultaneous sulfonation takes place to a greater or lesser extent.

When adding, for instance, sodium sulfate to the reaction mass, the degree of sulfonation can be decreased. Instead of sulfuric acid, zinc chloride may be used as acid condensing agent.

I claim:—

1. Condensation products derived from glyoxal-dianthraquinone compounds of the formula:

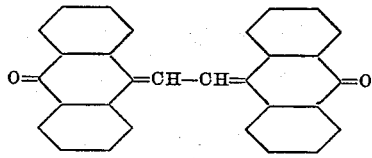

in which the anthraquinone nuclei may be substituted by halogen atoms or an alkyl- or arylgroup, which condensation products are when dry brownish powders, which are recrystallizable from organic solvents of a higher boiling point, soluble in concentrated sulfuric acid with a violet to bluish color and in an alkaline hydrosulfite solution with a yellowish brown color from which the vegetable fiber is dyed brown shades of a good fastness and which condensation products are obtained by subjecting said initial materials to an alkaline condensation reaction and the products thus obtained to an acid condensation reaction.

2. Condensation products derived from glyoxal-dianthraquinone compounds of the formula:

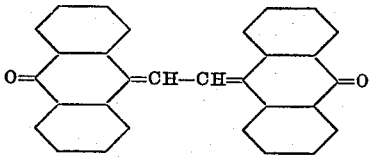

in which the anthraquinone nuclei may be substituted by halogen atoms or an alkyl- or arylgroup, which condensation products are when dry brownish powders which are recrystallizable from organic solvents of a higher boiling point, soluble in concentrated sulfuric acid with a violet to bluish color and in an alkaline hydrosulfite solution with a yellowish brown color, from which the vegetable fiber is dyed brown shades of a good fastness and which condensation products are obtained by subjecting said initial materials without isolation of an intermediate formed by alkaline condensation to the action of an acid condensing agent.

3. Condensation products derived from glyoxal-dianthraquinone compounds of the formula:

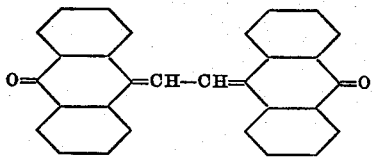

in which the anthraquinone nuclei may be substituted by halogen atoms or an alkyl- or arylgroup, which condensation products are when dry brownish powders which are recrystallizable from organic solvents of a higher boiling point, soluble in concentrated sulfuric acid with a violet to bluish color and in an alkaline hydrosulfite solution with a yellowish brown color, from which the vegetable fiber is dyed brown shades of a good fastness and which condensation products are obtained by subjecting said initial materials without isolation of an intermediate formed by alkaline condensation to the action of an acid condensing agent with the addition of an oxidant.

4. The condensation product derived from the glyoxal-dianthraquinone compound of the formula:

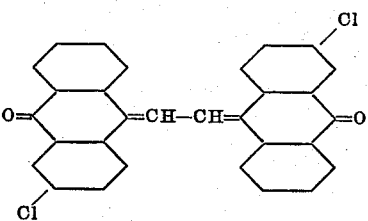

which condensation product is when dry a brownish powder which is recrystallizable from organic solvents of a higher boiling point, soluble in concentrated sulfuric acid with a dichroic red-violet color and in an alkaline hydrosulfite solution with a yellowish brown color from which the vegetable fiber is dyed brown shades of a good fastness and which condensation product is obtained by subjecting said initial material to an alkaline condensation reaction and the product thus obtained to an acid condensation reaction.

HEINZ SCHEYER.